United States Patent [19]

Miura et al.

[11] Patent Number: 5,642,795

[45] Date of Patent: Jul. 1, 1997

[54] ONE-WAY CLUTCH

[75] Inventors: Yoshihisa Miura; Tetsuaki Numata, both of Nara, Japan

[73] Assignee: Koyo Seiko Co., Ltd., Japan

[21] Appl. No.: 562,935

[22] Filed: Nov. 27, 1995

[51] Int. Cl.⁶ .............................. F16D 41/07; F16H 45/00
[52] U.S. Cl. ........................... 192/45.1; 188/82.8; 60/345
[58] Field of Search ............................. 192/45.1, 41 A, 192/3.34; 188/82.8; 60/341, 345, 346, 361, 362, 333

[56] References Cited

U.S. PATENT DOCUMENTS

| | | | |
|---|---|---|---|
| 2,912,086 | 11/1959 | Troendly et al. | 192/45.1 |
| 3,473,327 | 10/1969 | Szodfridt | 60/362 |
| 4,009,570 | 3/1977 | Ohkuoo et al. | 60/342 |
| 4,966,265 | 10/1990 | Wiese et al. | 192/35 |
| 5,168,702 | 12/1992 | Sakakibara et al. | 60/345 |
| 5,215,173 | 6/1993 | Gimmler | 192/3.3 |
| 5,320,204 | 6/1994 | Riggle et al. | 192/45.1 |
| 5,415,258 | 5/1995 | Numata | 192/41 A |

*Primary Examiner*—Richard M. Lorence
*Attorney, Agent, or Firm*—Adams & Wilks

[57] ABSTRACT

A one-way clutch comprises a first ring, a second ring spaced from the first ring to define an annular space therebetween, engaging members disposed in the annular space, at least one holding member for holding the engaging members, and a biasing member for biasing the engaging members in one direction. A pair of annular retaining members are disposed on opposite sides of the first and second rings to close the annular space between the first and second rings. Each annular retaining member has an inner surface provided with first and second stepped portions at first and second inner peripheral end surfaces thereof, respectively. The first stepped portion of each of the annular retaining members receives an end of the first ring, and the second stepped portion of each of the annular retaining members receives an end of the second ring. At least one of the annular retaining members has an annular recess at the inner surface thereof for receiving an end of the holding member.

20 Claims, 2 Drawing Sheets

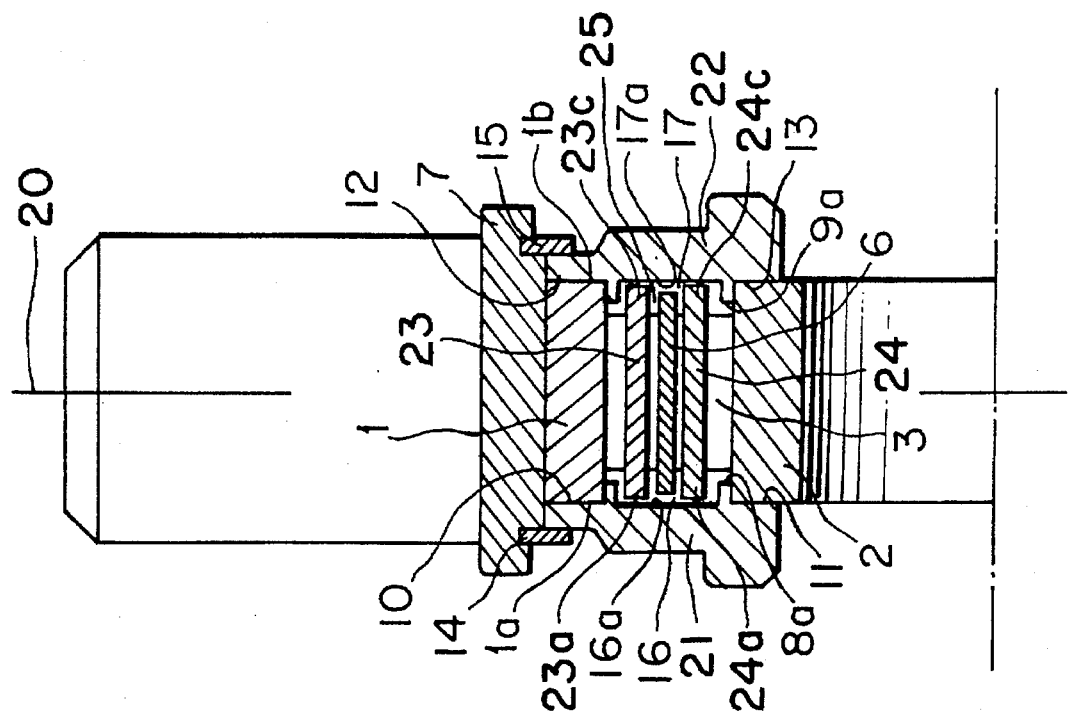
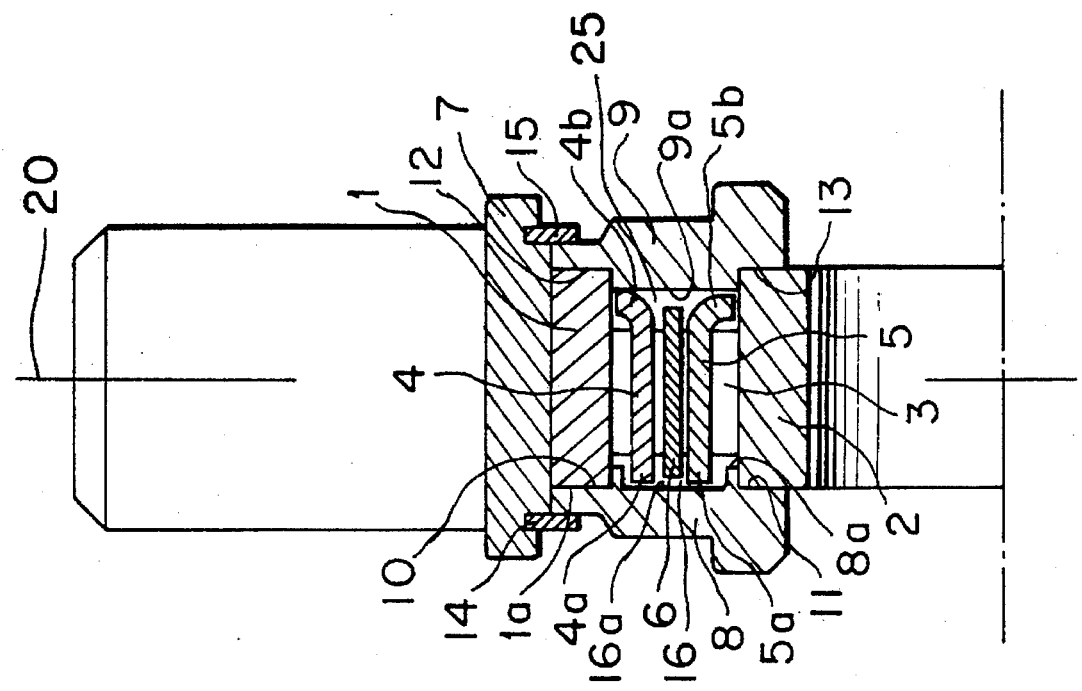

ONE-WAY CLUTCH

FIELD OF THE INVENTION

The present invention relates to a one-way clutch used for an automatic speed change mechanism, a torque converter and the like of an automobile.

DESCRIPTION OF RELATED ART

Recently, reductions in weight and size have been demanded for the torque converter and the like of an automobile. A one-way clutch used in torque converters and the like for the purpose of achieving the aforementioned demands has a tendency to be limited in size due to limitations in the axial space which it occupies. A one-way clutch of this type is shown in FIG. 3 and comprises an outer ring 30 press-fitted in and secured to a stator 36 by spline-fit or the like, an inner ring 31, a plurality of sprags 32 arranged between the outer ring 30 and the inner ring 31, an outer cage 33 and an inner cage 34 for holding the sprags 32, a spring 35 for biasing the sprags 32 in one direction, aluminum annular retainers 37, 38 having an outer diameter larger than an inner diameter of the outer ring 30 and an inner diameter smaller than an outer diameter of the inner ring 31 and arranged on both sides of the outer ring 30 so as to close a space defined between the inner and outer rings 31, 30, and stepped portions 39, 40, 41 and 42 formed in outer peripheral ends and inner peripheral portions of inner surfaces 37a, 38a, respectively, of the annular retainers 37, 38 within which an end of the outer ring 30 and an end of the inner ring 31 are respectively fitted.

By the foregoing construction, the inner surfaces 37a, 38a of the annular retainers 37, 38 are positioned within the space defined between the inner and outer rings 31, 30. The retainers 37, 38 are secured axially by snap rings 43, 44, respectively, together with the stator 36. Accordingly, the annular retainers 37, 38 locate and fix the one-way clutch axially and maintain a diametrical clearance between the inner and outer rings 31, 30 in an effort to meet the space saving demand.

However, since the inner surfaces 37a, 38a of the annular retainers 37, 38 are positioned within the space defined between the inner and outer rings 31, 30, the axial spacing between the inner surfaces 37a, 38a is small, thereby preventing the axial length of the cages 33, 34 from being increased. As a result, the axial length of the sprags 32 held by the cages 33, 34 is short, making it difficult to obtain a sufficient torque capacity.

SUMMARY OF THE INVENTION

The present invention provides a one-way clutch capable of providing a sufficient torque capacity without increasing the entire axial length of the one-way clutch.

The present invention provides a one-way clutch comprising an outer ring press-fitted in and secured to a housing member, an inner ring spaced from the outer ring to define an annular space therebetween, a plurality of engaging members arranged between the outer ring and the inner ring, a holding member for holding the engaging members, a spring for biasing each of the engaging members in one direction, a pair of annular retaining members having an outer diameter larger than an inner diameter of the outer ring and an inner diameter smaller than an outer diameter of the inner ring, and securing members each axially securing one of the annular retaining members. The annular retaining members are arranged on both sides of the outer ring so as to close the annular space between the inner and outer rings. Each annular retaining member has an inner surface provided with stepped portions formed at inner and outer peripheral ends thereof and in abutting relationship with ends of the inner and outer rings to thereby position the inner surface of each of the annular retaining members to close the annular space between the inner and outer rings. At least one of the annular retaining members is provided at its inner surface with an annular recess for receiving an end of the holding member to thereby increase the axial length of the holding member.

Since the annular recess is formed in the inner surface of at least one of the annular retaining members so that the end of the holding member is positioned within the recess, as described above, the axial length of the holding member and the engaging members can be increased without increasing the entire axial length of the one-way clutch. Accordingly, since the axial length of the engaging member held by the holding member can be increased, a sufficient torque capacity can be obtained.

BRIEF DESCRIPTION OF THE DRAWINGS

FIG. 1 is a longitudinal sectional view of a one-way clutch according to the present invention;

FIG. 2 is a longitudinal sectional view of a further embodiment of the one-way clutch according to the present invention.

DETAILED DESCRIPTION OF THE PREFERRED EMBODIMENTS

Figure 3:
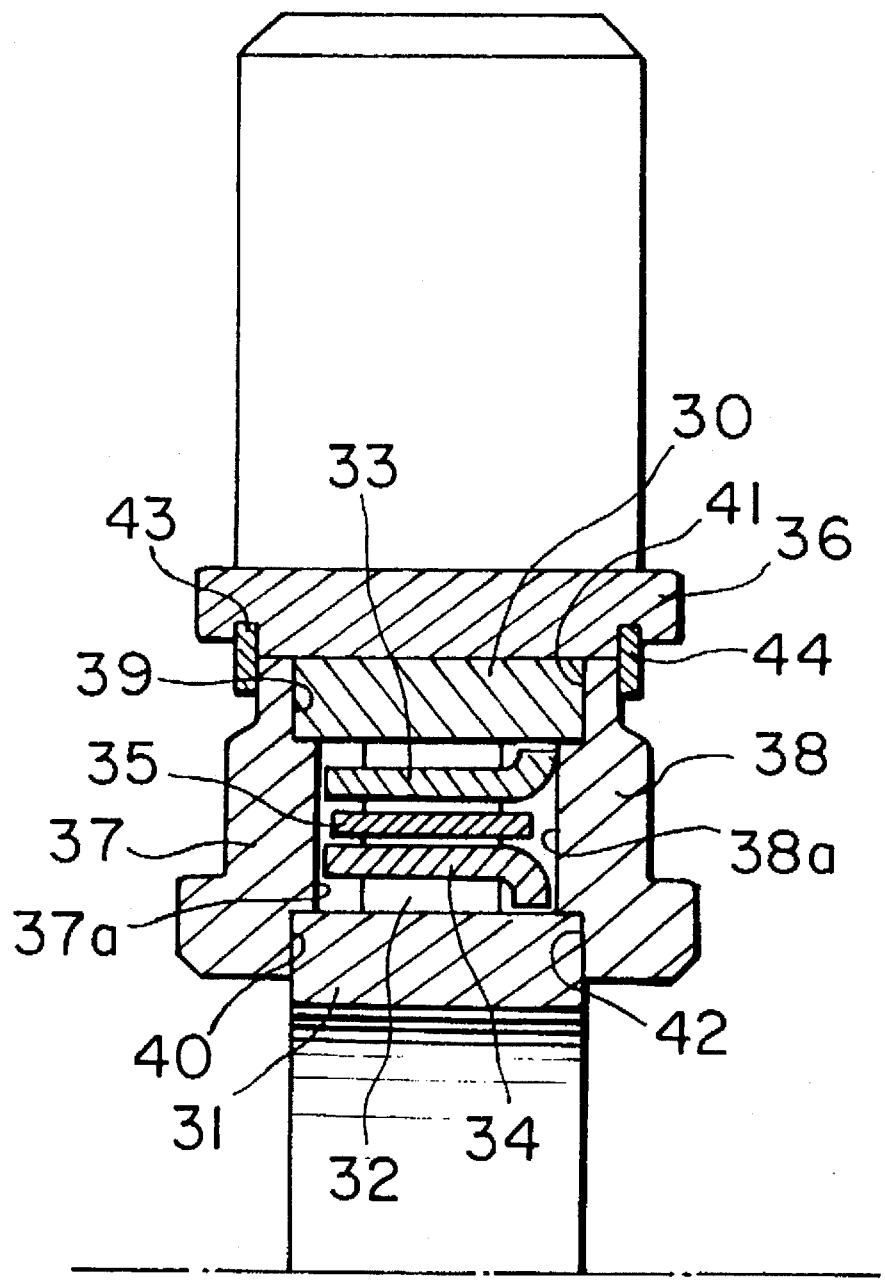
FIG. 3 is a longitudinal sectional view of a one-way clutch according to the prior art.

The embodiments of the present invention will be described hereinafter with reference to the drawings. In one embodiment, as shown in FIG. 1, the one-way clutch comprises an outer ring 1 press-fitted in and secured to a housing member, such as a stator 7, by means of a spline-fit or the like, and an inner ring 2 spaced from the outer ring 2 so as to define an annular space 25 therebetween. A plurality of engaging members, such as sprags 3, are arranged in the annular space 25 between the outer and inner rings 1, 2 and are supported by holding members, such as outer and inner cages 4, 5. A spring 6 is interposed between the outer and inner cages 4, 5 for biasing the sprags 3 in one direction. Annular retaining members 8, 9 formed, for example, of aluminum are arranged on opposite sides of the outer ring 1. Preferably as shown in FIG. 1, the inner ring 1 and the outer ring 2 have a rectangular cross-sectional shape.

The outer cage 4 and the inner cage 5 have first end portions terminating, respectively, in first straight ends 4a and 5a, and second end portions terminating, respectively, in second ends 4b and 5b which are formed into flanges radially bent toward an inner peripheral surface of the outer ring 1 and toward an outer peripheral surface of the inner ring 2, respectively.

The annular retaining members 8, 9 are respectively secured axially to the housing member 7 by means of securing members, such as snap rings 14, 15, and are arranged on opposite sides of the outer ring 1 so as to close the annular space 25 between the outer and inner rings 1, 2. The annular retaining members 8, 9 have inner surfaces 8a and 9a, respectively, and have an outer diameter larger than an inner diameter of the outer ring 1 and an inner diameter smaller than an outer diameter of the inner ring 2. An outer peripheral end and an inner peripheral portion of the inner surfaces 8a, 9a of the annular retaining members 8, 9 are formed with L-shaped stepped portions 10, 11 and 12, 13, respectively. An end of the outer ring 1 and an end of the inner ring 2 are loosely fitted in abutting relationship with the stepped portions 10, 12 and 11, 13, respectively, to thereby position the inner surfaces 8a, 9a of the annular retaining members 8, 9 to close the annular space between the outer and inner rings 1, 2.

In the present embodiment, the inner surface 8a of the annular retaining member 8 is formed with an annular recess 16 into which the first straight ends 4a, 5a of the outer and inner cages 4, 5, respectively, are inserted and positioned. An inner surface 16a of the annular recess 16 is positioned at an axial distance from a central axis 20 which is substantially equal to or greater than an axial distance between a side surface 1a of the outer ring 1 and the central axis 20. By this construction, the axial depth of the annular recess 16 can be made greater, thereby permitting the axial length of the cages 4, 5 and the sprags 3 to be increased without increasing the entire axial length of the one-way clutch.

While in the outer cage 4 and the inner cage 5 the first ends 4a, 5a are straight and the second ends 4b, 5b are in the form of radially bent flanges, it is to be noted that the second ends 4b, 5b can also be straight as shown at 4c, 5c in the embodiment of FIG. 2. In the case of the embodiment of FIG. 2, an inner surface 9a of the annular retaining member 9 to which the straight ends 4c, 5c of the inner and outer cages 4, 5 correspond is formed with an annular recess 17. The straight ends 4c, 5c of the outer and inner cages 4, 5 are inserted and positioned within the annular recess 17. Since the straight ends 4a, 5a of the outer and inner cages 4, 5 in the embodiment of FIG. 2 are similar in construction to the first straight ends 4a, 5a shown in the embodiment of FIG. 1, a description thereof is omitted.

The position of the inner surface 16a of the annular recess 16 relative to the side surface 1a of the outer ring 1 is as mentioned above for the embodiment of FIG. 1. An inner surface 17a of the annular recess 17 is likewise positioned at an axial distance from the central axis 20 which is substantially equal to or greater than an axial distance between a side surface 1b of the outer ring 1 and the central axis 20. By this construction, the axial depth of the annular recess 17 can be made greater, thereby permitting the axial length of the cages 4, 5 and the sprags 3 to be increased without increasing the entire axial length of the one-way clutch.

In the construction shown in FIG. 2, since ends 23a, 24a, 23c, 24c of the outer and inner cages 23, 24 are respectively positioned within annular recesses 16, 17 of annular retaining members 21, 22, the axial length of the inner and outer cages 23, 24 and, therefore, the axial length of the sprags 3, can be made longer to obtain a greater torque capacity without increasing the axial length of the one-way clutch.

While the above-described embodiments of the one-way clutch employ inner and outer cages, it is not limited thereto and the present invention can be also applied to a one-way clutch which employs a single cage for holding the sprags. Furthermore, the engaging members disposed between the outer and inner rings 1, 2 is not limited to sprags.

We claim:

1. A one-way clutch comprising: an outer ring press-fitted in and secured to a housing member; an inner ring spaced from the outer ring to define an annular space therebetween; a plurality of engaging members arranged in the annular space between the outer ring and the inner ring; holding means for holding the engaging members; a spring for biasing each of the engaging members in one direction; a pair of annular retaining members each having an outer diameter larger than an inner diameter of the outer ring and an inner diameter smaller than an outer diameter of the inner ring, the annular retaining members being arranged on opposite sides of the outer ring so as to close the annular space between the inner and outer rings, each of the annular retaining members having an inner surface provided with stepped portions formed at inner and outer peripheral ends thereof and in abutting relationship with ends of the inner and outer rings to thereby position the inner surface of each of the annular retaining members to close the annular space between the inner and outer rings, at least one of the annular retaining members being formed in its inner surface with an annular recess for receiving an end of the holding means; and securing means for axially securing the annular retaining members.

2. A one-way clutch according to claim 1; wherein the housing member comprises a stator.

3. A one-way clutch according to claim 1; wherein the outer ring has a side surface positioned at a first axial distance from a central axis of the one-way clutch; and wherein the annular recess has an inner peripheral surface positioned at a second axial distance from the central axis substantially equal to or greater than the first axial distance.

4. A one-way clutch according to claim 3; wherein the inner and outer rings have a rectangular cross-sectional shape.

5. A one-way clutch according to claim 1; wherein the holding means comprises a pair of spaced annular holding members; and wherein the spring is disposed between the annular holding members.

6. A one-way clutch according to claim 1; wherein both of the annular retaining members are provided with an annular recess at inner surfaces thereof for receiving opposite ends of the holding means.

7. A one-way clutch according to claim 6; wherein the outer ring has a pair of side surfaces each positioned at a first axial distance from a central axis of the one-way clutch; and wherein each of the annular recesses has an inner peripheral surface positioned at a second axial distance from the central axis substantially equal to or greater than the first axial distance.

8. A one-way clutch according to claim 6; wherein each of the annular recesses has an inner peripheral surface facing and spaced from one of the ends of the holding means.

9. A one-way clutch according to claim 1; wherein the inner and outer rings have a rectangular cross-sectional shape.

10. A one-way clutch according to claim 1; wherein the annular recess has an inner peripheral surface facing and spaced from the end of the holding means.

11. A one-way clutch comprising:

a first ring;

a second ring spaced from the first ring to define an annular space therebetween;

a plurality of engaging members disposed in the annular space;

holding means for holding the engaging members;

biasing means for biasing the engaging members in one direction;

a pair of annular retaining members disposed on opposite sides of the first and second rings to close the annular space, each annular retaining member having an inner surface provided with first and second stepped portions at first and second inner peripheral end surfaces thereof, respectively, the first stepped portion of each of the annular retaining members receiving an end of the first ring, the second stepped portion of each of the annular retaining members receiving an end of the second ring, and at least one of the annular retaining members having an annular recess at the inner surface thereof for receiving an end of the holding means; and securing means for axially securing the annular retaining members.

12. A one-way clutch according to claim 11; wherein each of the annular retaining members is provided with an annular recess at inner surfaces thereof for receiving respective opposite ends of the holding means.

13. A one-way clutch according to claim 12; wherein the first ring has a pair of side surfaces each positioned at a first axial distance from a central axis of the one-way clutch; and wherein each of the annular recesses has an inner peripheral surface positioned at a second axial distance from the central axis substantially equal to or greater than the first axial distance.

14. A one-way clutch according to claim 12; wherein each of the annular recesses has an inner peripheral surface facing and spaced from one of the ends of the holding means.

15. A one-way clutch according to claim 11; wherein the first ring has a side surface positioned at a first axial distance from a central axis of the one-way clutch; and wherein the annular recess has an inner peripheral surface positioned at a second axial distance from the central axis substantially equal to or greater than the first axial distance.

16. A one-way clutch according to claim 11; wherein the holding means comprises a pair of spaced annular holding members; and wherein the biasing means is disposed between the annular holding members.

17. A one-way clutch according to claim 11; wherein the first and second rings have a rectangular cross-sectional shape.

18. A one-way clutch according to claim 11; wherein the annular recess has an inner peripheral surface facing and spaced from the end of the holding means.

19. A one-way clutch comprising: a first ring having a rectangular cross-section and a side surface positioned at a first axial distance from a central axis of the one-way clutch; a second ring spaced from the first ring to define an annular space therebetween and having a rectangular cross-section; a plurality of engaging members disposed in the annular space; holding means for holding the engaging members; biasing means for biasing the engaging members in one direction; a pair of annular retaining members disposed on opposite sides of the first and second rings to close the annular space, each annular retaining member having an inner surface provided with first and second stepped portions at first and second inner peripheral end surfaces thereof, respectively, the first stepped portion of each of the annular retaining members receiving an end of the first ring, the second stepped portion of each of the annular retaining members receiving an end of the second ring, and one of the annular retaining members having an annular recess at the inner surface thereof for receiving an end of the holding means, the annular recess having an inner peripheral surface positioned at a second axial distance from the central axis substantially equal to or greater than the first axial distance; and securing means for axially securing the annular retaining members.

20. A one-way clutch according to claim 19; wherein the end of the holding means is spaced from the inner peripheral surface of the annular recess.

* * * * *